United States Patent
Nagase

(10) Patent No.: US 10,377,184 B2
(45) Date of Patent: *Aug. 13, 2019

(54) PNEUMATIC TIRE

(71) Applicant: Sumitomo Rubber Industries, Ltd., Kobe-shi, Hyogo (JP)

(72) Inventor: Hiroki Nagase, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 306 days.

This patent is subject to a terminal disclaimer.

(21) Appl. No.: 15/189,059

(22) Filed: Jun. 22, 2016

(65) Prior Publication Data

US 2017/0015143 A1     Jan. 19, 2017

(30) Foreign Application Priority Data

Jul. 16, 2015  (JP) ................. 2015-141930

(51) Int. Cl.
  *B60C 11/03*   (2006.01)
  *B60C 11/12*   (2006.01)

(52) U.S. Cl.
  CPC ........ *B60C 11/125* (2013.01); *B60C 11/0304* (2013.01); *B60C 11/1259* (2013.01);
  (Continued)

(58) Field of Classification Search
  CPC ......... B60C 11/0304; B60C 2011/0388; B60C 2011/039; B60C 2011/0386;
  (Continued)

(56) References Cited

U.S. PATENT DOCUMENTS

2010/0051154 A1*  3/2010  Ebiko ................. B50C 11/0306
                                               152/209.18
2011/0024012 A1*  2/2011  Iwai .................... B60C 11/0306
                                               152/209.27
(Continued)

FOREIGN PATENT DOCUMENTS

DE    19900266 A1 * 10/2000 ......... B60C 11/0302
EP    2716477 A1    4/2014
(Continued)

OTHER PUBLICATIONS

Extended European Search Report for European Application No. 16177400.5, dated Dec. 14, 2016.

*Primary Examiner* — Robert C Dye
*Assistant Examiner* — Cedrick S Williams
(74) *Attorney, Agent, or Firm* — Birch, Stewart, Kolasch & Birch LLP

(57) ABSTRACT

A pneumatic tire includes a tread portion provided with main grooves and land potions. The main grooves include an outboard shoulder main groove, an inboard shoulder main groove and a central main groove disposed therebetween. The land portions include an outboard central land portion and an inboard central land portion. The outboard central land portion is provided with first central sipes with a width of less than 2 mm, and is not provided with any grooves with a width equal to or more than 2 mm. The inboard central land portion is provided with second central sipes with a width of less than 2 mm, and is not provided with any grooves with a width equal to or more than 2 mm. The inboard central land portion is greater than the outboard central land portion in axial width.

17 Claims, 6 Drawing Sheets

(52) U.S. Cl.
CPC ... *B60C 11/1272* (2013.01); *B60C 2011/0344* (2013.01); *B60C 2011/0353* (2013.01); *B60C 2011/0365* (2013.01); *B60C 2011/0386* (2013.01); *B60C 2011/1209* (2013.01)

(58) Field of Classification Search
CPC ............. B60C 11/1218; B60C 11/1277; B60C 11/1263; B60C 11/1281; B60C 11/0369; B60C 11/1204; B60C 11/1259; B60C 11/1272; B60C 2011/0344; B60C 2011/0353; B60C 2011/0365; B60C 2011/1209
See application file for complete search history.

(56) References Cited

U.S. PATENT DOCUMENTS

| | | | |
|---|---|---|---|
| 2012/0247632 A1* | 10/2012 | Hayashi | B60C 11/12 152/209.22 |
| 2014/0090759 A1* | 4/2014 | Tanaka | B60C 11/0306 152/209.8 |
| 2014/0138000 A1* | 5/2014 | Inoue | B60C 11/1392 152/209.8 |
| 2014/0283967 A1* | 9/2014 | Inoue | B60C 11/12 152/209.18 |
| 2015/0041034 A1* | 2/2015 | Matsushita | B60C 11/04 152/209.24 |
| 2015/0151584 A1* | 6/2015 | Koishikawa | B60C 11/0306 152/209.18 |
| 2017/0136826 A1* | 5/2017 | Kato | B60C 11/13 |

FOREIGN PATENT DOCUMENTS

| | | | | |
|---|---|---|---|---|
| EP | 2862728 | A1 | 4/2015 | |
| EP | 2899041 | A1 * | 7/2015 | ......... B60C 11/1204 |
| JP | 2000-135904 | A | 5/2000 | |
| JP | 2013-78984 | A | 5/2013 | |

* cited by examiner

PNEUMATIC TIRE

BACKGROUND ART

Field of the Invention

The present invention relates to pneumatic tires, and in particular to a pneumatic tire capable of improving drainage performance and wear resistance.

Description of the Related Art

Conventionally, in order to improve drainage performance, pneumatic tires including a tread portion provided with an improved groove have been proposed. For example, Japanese Unexamined Patent Application Publication No. 2000-135904 discloses a pneumatic tire having three main grooves and a plurality of lug grooves to improve the drainage performance. The pneumatic tire would improve drainage performance through widened three main grooves. Unfortunately, the pneumatic tire tends to be lower in the pattern rigidity and it may bring deterioration of wear resistance.

Furthermore, general automobiles, e.g. passenger cars, typically have negative camber angle. When a tire is mounted on such a passenger car with negative camber, an inboard region of the tire tread is subject to receiving large tire load and then uneven wear tends to occur. Accordingly, wear resistance of the tire is deteriorated.

SUMMARY OF THE INVENTION

In view of the above problems in the conventional art, the present invention has an object to provide a pneumatic tire capable of improving both drainage performance and wear resistance to a high level by basically providing sipes between main grooves.

According to one aspect of the invention, a pneumatic tire includes a tread portion provided with a plurality of circumferentially and continuously extending main grooves to form a plurality of land potions, the tread portion including a designated installing direction to a vehicle to have an outboard tread edge and an inboard tread edge. The main grooves include an outboard shoulder main groove disposed on the side of the outboard tread edge, an inboard shoulder main groove disposed on the side of the inboard tread edge and a central main groove disposed between the outboard shoulder main groove and the inboard shoulder main groove. The land portions include an outboard central land portion between the outboard shoulder main groove and the central main groove, and an inboard central land portion between the inboard shoulder main groove and the central main groove. The outboard central land portion is provided with a plurality of first central sipes having a width of less than 2 mm, and is not provided with any grooves having a width equal to or more than 2 mm. The inboard central land portion is provided with a plurality of second central sipes having a width of less than 2 mm, and is not provided with any grooves having a width equal to or more than 2 mm. The first central sipes extend from the central main groove to the outboard shoulder main groove. The second central sipes extend from the central main groove to the inboard shoulder main groove. The inboard central land portion has an axial width greater than an axial width of the outboard central land portion.

In another aspect of the invention, the outboard central land portion may be provided with a third central sipe between adjacent first central sipes, and the third central sipe may have a width of less than 2 mm and at least one end terminating within the outboard central land portion.

In another aspect of the invention, the first central sipes, the second central sipes and the third central sipe may be inclined at an angle equal to or less than 40 degrees with respect to an axial direction of the tire.

In another aspect of the invention, the angle with respect to the axial direction of the tire of the second central sipes may be greater than the angles with respect to the axial direction of the tire of the first central sipes and the third central sipe.

In another aspect of the invention, the number of the second central sipes provided on the inboard central land portion may be in a range of from 40% to 70% of a total number of the first central sipes and the third central sipe provided on the outboard central land portion.

In another aspect of the invention, at least one acute angled portion of the land portions formed by the first central sipes, the second central sipes and the third central sipe may be chamfered.

In another aspect of the invention, the third central sipe may have an axial length in a range of from 60% to 75% of the axial width of the outboard central land portion.

In another aspect of the invention, the axial width of the inboard central land portion may be in a range of from 101% to 105% of an axial width of the outboard central land portion.

In another aspect of the invention, a width of the outboard shoulder main groove may be in a range of from 60% to 80% of a width of the inboard shoulder main groove.

In another aspect of the invention, the land portions may further include an outboard shoulder land portion between the outboard shoulder main groove and the outboard tread edge and an inboard shoulder land portion between the inboard shoulder main groove and the inboard tread edge, the outboard shoulder land portion may be provided with outboard shoulder lug grooves having a width equal to or more than 2 mm, the inboard shoulder land portion may be provided with inboard shoulder lug grooves having a width equal to or more than 2 mm, the outboard shoulder lug grooves may extend from axially inner ends being not in communication with the outboard shoulder main groove to an axially outer ends located beyond the outboard tread edge, and the inboard shoulder lug grooves may extend axially outwardly from the inboard shoulder main groove beyond the inboard tread edge.

In another aspect of the invention, at least one of the inboard shoulder lug grooves may include a tie-bar at a portion near the inboard shoulder main groove.

In another aspect of the invention, an acute angled portion of the inboard shoulder land portion formed by the inboard shoulder lug grooves may be chamfered.

DESCRIPTION OF THE PREFERRED EMBODIMENTS

Figure 1:
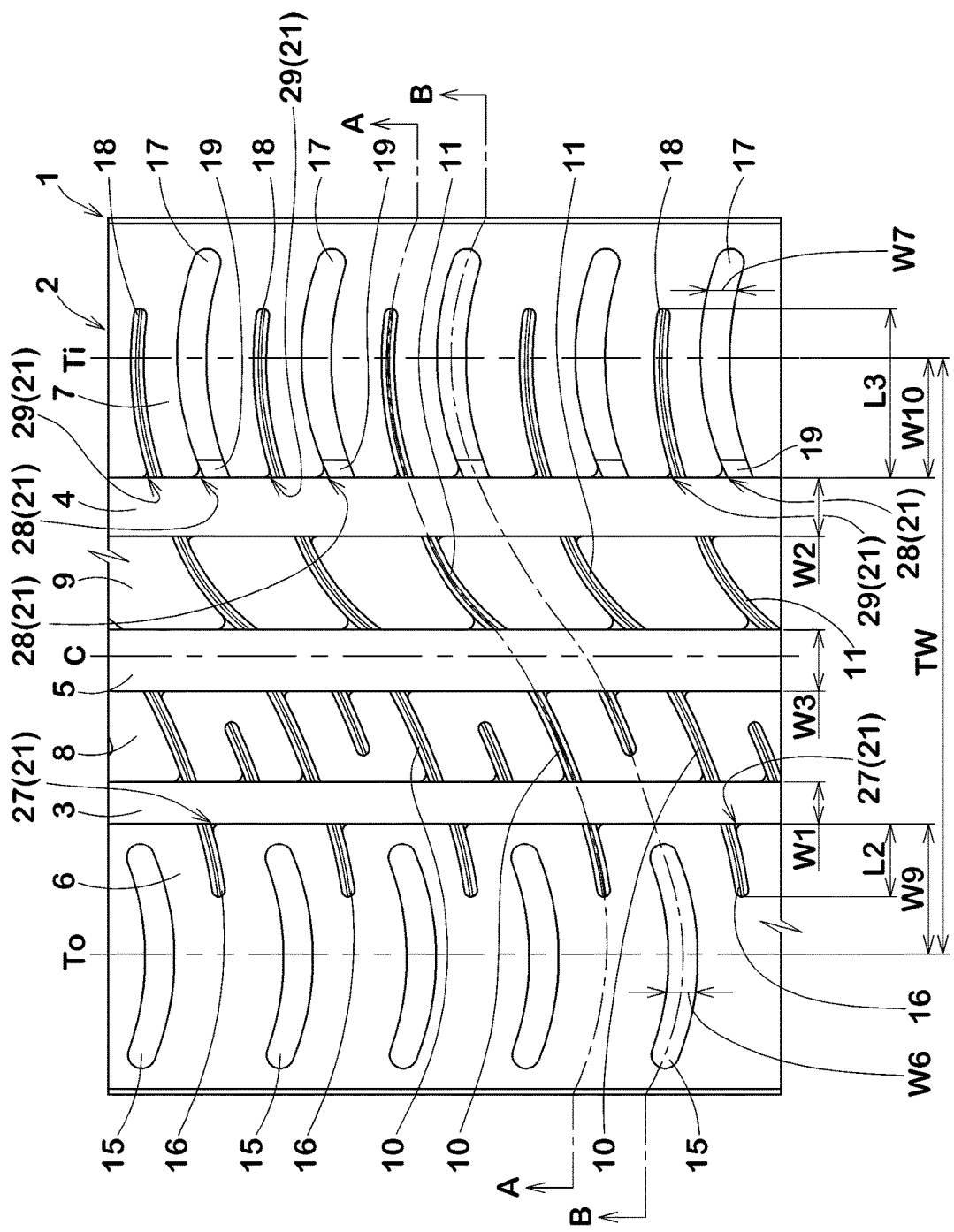
FIG. 1 is a development view of a tread portion of a pneumatic tire according to an embodiment of the present invention.

An embodiment of the present invention will be explained below with reference to the accompanying drawings. FIG. 1 illustrates a development view of a tread portion 2 of a pneumatic tire 1 according to an embodiment of the present invention. As illustrated in FIG. 1, a pneumatic tire 1 includes a tread portion 2 provided with a plurality of circumferentially and continuously extending main grooves and a plurality of land portions separated by the main grooves. The pneumatic tire 1 according the present embodiment can preferably be mounted on passenger cars with negative camber. The tread portion 2 is configured as an asymmetrically tread pattern which has a designated installing direction to a vehicle. The installing direction may be displayed on a sidewall portion (not illustrated) with characters and the like.

The tread portion 2 includes an outboard tread edge To which is intended to be located outside of a vehicle when the tire is mounted on the vehicle, and an inboard tread edge Ti which is intended to be located inside of the vehicle when the tire is mounted on the vehicle.

The outboard tread edge To and the inboard tread edge Ti are defined as the axially outermost edges of the ground contacting patch of the tread portion 2 which occurs under a standard condition with a standard tire load when the camber angle of the tire 1 is zero. The standard condition is such that the tire 1 is mounted on a standard wheel rim (not illustrated) with a standard pressure, but is loaded with no tire load. The tread width TW is defined as an axial distance between the outboard tread edge To and the inboard tread edge Ti under the standard condition. Unless otherwise noted, dimensions of respective portions of the tire 1 are values specified in the standard condition.

As used herein, the standard wheel rim is a wheel rim officially approved or recommended for the tire by standards organizations, wherein the standard wheel rim is the "standard rim" specified in JATMA, the "Measuring Rim" in ETRTO, and the "Design Rim" in TRA or the like, for example.

As used herein, the standard pressure is a standard pressure officially approved or recommended for the tire by standards organizations, wherein the standard pressure is the "maximum air pressure" in JATMA, the "Inflation Pressure" in ETRTO, and the maximum pressure given in the "Tire Load Limits at Various Cold Inflation Pressures" table in TRA or the like, for example. In case of passenger car tires, however, the standard pressure is defined as 180 kPa.

As used herein, the standard tire load is a tire load officially approved or recommended for the tire by standards organizations, wherein the standard tire load is the "maximum load capacity" in JATMA, the "Load Capacity" in ETRTO, and the maximum value given in the above-mentioned table in TRA or the like. In case of passenger car tires, however, the standard tire load is defined as a load of 88% of the above load.

The main grooves include an outboard shoulder main groove 3 disposed on the side of the outboard tread edge To with respect to the tire equator C, an inboard shoulder main groove 4 disposed on the side of the inboard tread edge Ti with respect to the tire equator C and a central main groove 5 disposed between the outboard shoulder main groove 3 and the inboard shoulder main groove 4.

Each of the outboard shoulder main groove 3, the inboard shoulder main groove 4 and the central main groove 5 extends in a straight shape. Such a straight main groove improves drainage performance on wet surfaces. Preferably, a total (W1+W2+W3) of widths W1, W2 and W3 of the outboard shoulder main groove 3, the inboard shoulder main groove 4 and the central main groove 5 respectively is in a range of from 25% to 29% of the tread width TW.

When the total W1+W2+W3 is less than 25% of the tread width TW, drainage performance on wet surfaces may be deteriorated. On the other hand, when the total W1+W2+W3 is more than 29% of the tread width TW, a ground contact area of the tread portion 2 tends decrease and thus wear resistance may be deteriorated. Preferably, the width W1 of the outboard shoulder main groove 3 is smaller than the width W2 of the inboard shoulder main groove 4 and smaller than the width W3 of the central main groove 5. Preferably, the width W1 of the outboard shoulder main groove 3 is in a range of from 60% to 80% the width W2 of the inboard shoulder main groove 4. This configuration may increase rigidity in an outboard tread portion, which tends to receive large lateral force during cornering, to improve the wear resistance. Furthermore, sufficient drainage performance can be obtained even by the inboard shoulder main groove where drainage performance tends to be lower due to an alignment of a vehicle.

Preferably, the width W3 of the central main groove 5 is greater than the width W2 of the inboard shoulder main groove 4. The central main groove 5 can improve drainage performance around the tire equator C on which large ground contact pressure acts.

Figure 2:
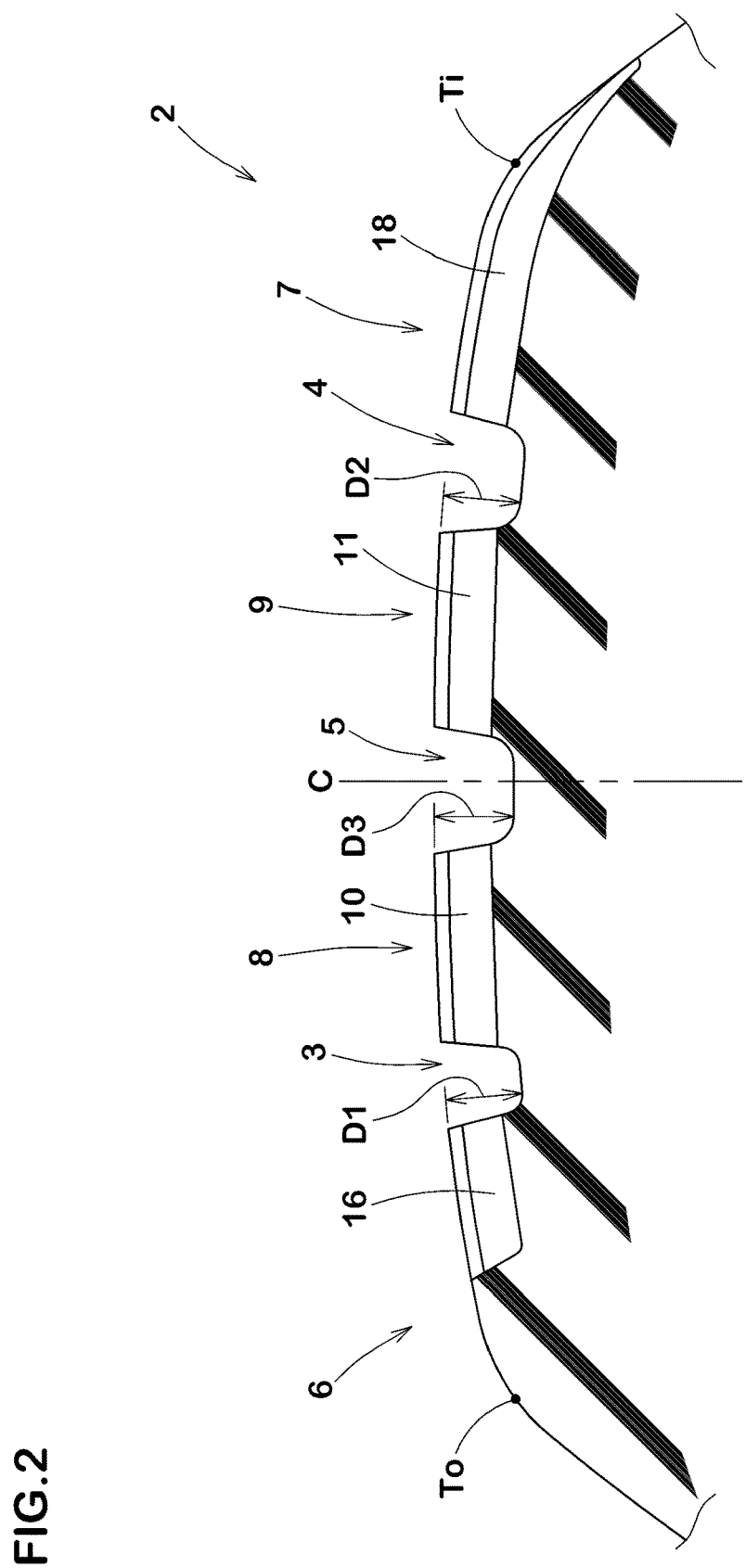
FIG. 2 is a cross-sectional view taken along a line A-A of FIG. 1.

FIG. 2 illustrates a cross-sectional view taken along a line A-A of FIG. 1. As illustrated in FIG. 2, depths D1, D2 and D3 of the outboard shoulder main groove 3, the inboard shoulder main groove 4 and the central main groove 5 respectively are determined variously according to the custom. Preferably, the depths D1 to D3 of the main grooves, for example, are in a range of from 5 to 10 mm in case of passenger car tires.

When the depths D1 to D3 are less than 5 mm, drainage performance on wet surfaces may be deteriorated. When the depths D1 to D3 are more than 10 mm, rigidity of the tread portion 2 as well as wear resistance may be deteriorated.

As illustrated in FIG. 1, the land portions according to the present embodiment include an outboard central land portion 8 between the outboard shoulder main groove 3 and the central main groove 5, and an inboard central land portion 9 between the inboard shoulder main groove 4 and the central main groove 5.

Figure 3:
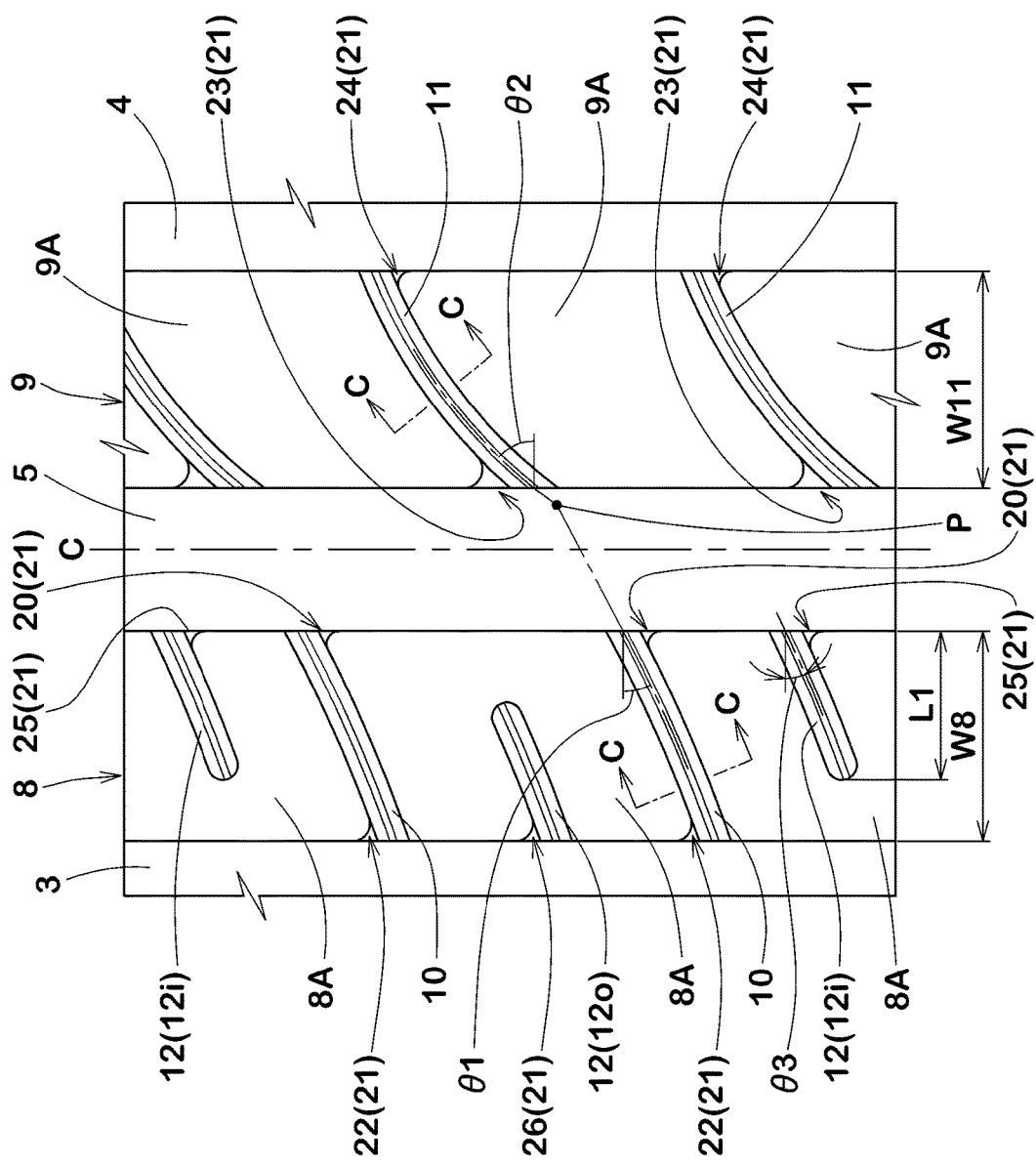
FIG. 3 is a partial enlarged view of an outboard central land portion and an inboard central land portion.

FIG. 3 illustrates a partial enlarged view of the outboard central land portion 8 and the inboard central land portion 9. As illustrated in FIG. 3, preferably, an axial width W11 of the inboard central land portion 9 is greater than an axial width W8 of the outboard central land portion 8. Thus, rigidity in the inboard central land portion 9 can be set greater than that of the outboard central land portion 8. Accordingly, when the pneumatic tire 1 is mounted on a vehicle with negative camber, a wear amount on the inboard central land portion 9 tends to be substantially same as or approach a wear amount on the outboard central land portion 8.

Preferably, the axial width W11 of the inboard central land portion 9 is in a range of from 101% to 105% of the axial width W8 of the outboard central land portion 8 in order to further improve wear resistance of the tire by preventing uneven wear due to an alignment of a vehicle.

Preferably, the outboard central land portion 8 and the inboard central land portion 9 are not provided with any grooves having a width equal to or more than 2 mm. Thus, rigidity of both the outboard central land portion 8 and the inboard central land portion 9, which are subject to receiving large ground contact pressure, can be improved so as to have an excellent wear resistance.

The outboard central land portion 8 is provided with a plurality of first central sipes 10 having a width of less than 2 mm. The inboard central land portion 9 is provided with a plurality of second central sipes 11 having a width of less than 2 mm. The rigidity of the outboard central land portion 8 and the rigidity of the inboard central land portion 9 would be optimized by the first central sipes 10 and the second central sipes 11 respectively.

Figure 4:
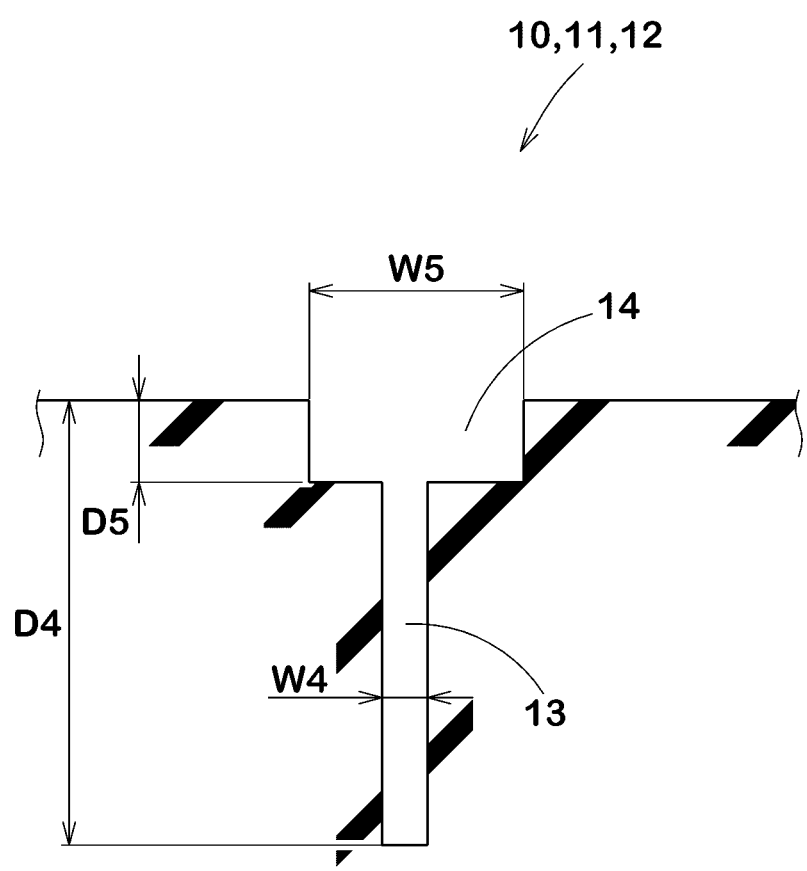
FIG. 4 is a cross-sectional view taken along lines C-C of FIG. 3.

FIG. 4 illustrates a cross-sectional view taken along lines C-C of FIG. 3. As illustrated in FIG. 4, each of the first central sipes 10 and the second central sipes 11 includes a sipe main body 13 and a top opening 14.

Preferably, the sipe main body 13 has a width W4 of less than 1 mm. This configuration may be useful to suppress deformation of the outboard central land portion 8 and the inboard central land portion 9 to improve the wear resistance performance by closing sipes easily when force is acted on the outboard central land portion 8 and the inboard central land portion 9.

Preferably, a sipe depth D4 from a tread ground-contact surface to a bottom of the sipe main body 13 is in a range of from 50% to 90% of the depth D3 of the central main groove 5 (shown in FIG. 2). When the depth D4 is less than 50% of the depth D3 of the central main groove 5, ride comfort of the tire may be deteriorated due to excessively high rigidity of the outboard central land portion 8 and the inboard central land portion 9. On the other hand, when the sipe depth D4 is more than 90% of the depth D3 of the central main groove 5, wear resistance of the tire may be deteriorated due to excessively low rigidity in the outboard central land portion 8 and the inboard central land portion 9.

The top opening 14 is provided on radially outward of the sipe main body 13. In this embodiment, the top opening 14 is configured as a portion that is widened in both sides of the sipe main body 13. A width W5 of the top opening 14 is preferably equal to or more than 1 mm, but less than 2 mm. A depth D5 of the top opening 14 is preferably in a range of from 0.5 to 2.0 mm. The top opening 14 can increase ground contact pressure to be acted on the outboard central land portion 8 and the inboard central land portion 9 by decreasing the respective ground contact areas. Thus, the drainage performance on wet surfaces of the pneumatic tire 1 can improve.

Preferably, the top opening 14 is provided over the entire length of the first central sipes 10 and the second central sipes 11. Furthermore, the top opening 14 has a rectangular cross-sectional shape in order to drain as much water as possible. In addition, since the top opening 14 can offer not only a top edge on the ground-contact surface but also a step edge between the sipe main body 13 and the top opening 14, excellent edge effect can be obtained.

As illustrated in FIG. 3, the first central sipes 10, for example, extend from the central main groove 5 to the outboard shoulder main groove 3. The outboard central land portion 8 is separated into a plurality of outboard central blocks 8A by a plurality of the first central sipes 10. The first central sipes 10 may increase ground contact pressure to be acted on the outboard central land portion 8.

Preferably, the first central sipes 10 are inclined in a direction with respect to the axial direction of the tire.

Preferably, the first central sipes are inclined at an angle θ1 equal to or less than 40 degrees with respect to the axial direction of the tire at the junctions to the central main groove 5. When the angle θ1 is more than 40 degrees, rigidity of each junction, i.e., rigidity of each first acute angled portion 20 formed between a first central sipe 10 and the central main groove 5 may locally decrease, and thus wear resistance may be deteriorated.

Preferably, the first acute angled portion 20 is provided with a chamfered portion 21. Furthermore, each second acute angled portion 22 which is a portion formed between a first central sipe 10 and the outboard shoulder main groove 3 is also formed as a chamfered portion 21. These chamfered portions 21 prevent local decrease of rigidity in the first and second acute angled portions 20 and 22 to further improve wear resistance.

Figure 5:
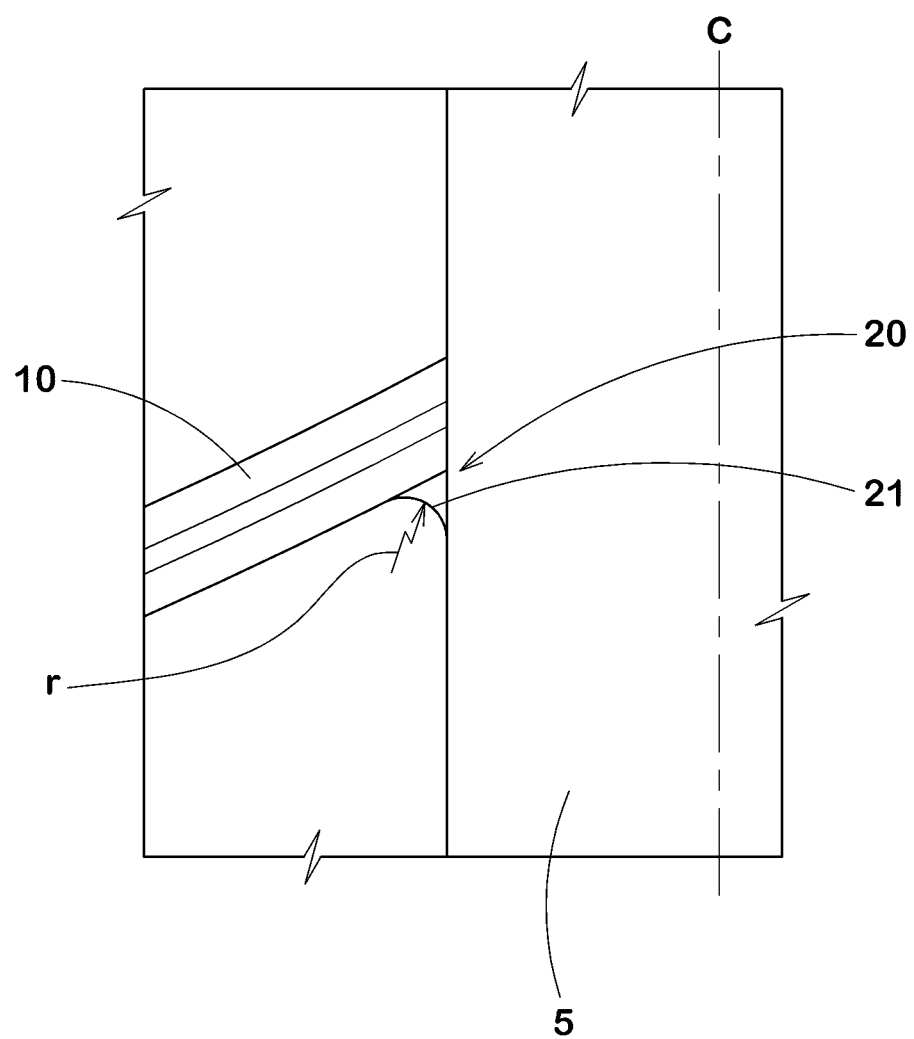
FIG. 5 is a partial enlarged view of a first acute angled portion.

FIG. 5 illustrates a partial enlarged view of the first acute portion 20 of FIG. 3. As illustrated in FIG. 5, the first acute angled portion 20 is preferably chamfered in a round or cone shape. Preferably, the chamfered portion 21 has a radius of curvature (r) on the ground contact surface is 3 mm or less. When the radius (r) is more than 3 mm, the wear resistance may be deteriorated by reduction of a ground contact surface area of the outboard central land portion 8. Alternatively, the chamfered portion 21 may be formed as a slant flat plane.

Preferably, a depth of the chamfered portion 21 is 2 mm or less. When the depth of the chamfered portion 21 is more than 2 mm, the wear resistance may deteriorate by reduction of rigidity of the outboard central land portion 8.

As illustrated in FIG. 3, the first central sipes 10, in this embodiment, do not include any portion extending in parallel with the axial direction of the tire. Thus, the first central sipes 10 can close itself at cornering that large lateral force acts on the outboard central land portion 8. Accordingly, circumferentially adjacent outboard central blocks 8A support each other to enhance lateral rigidity of the tread portion 2 when cornering, and thus wear resistance of the tire can further be improved by reducing deformation of the outboard central land portion 8 during cornering.

The second central sipes 11, for example, extend from the central main groove 5 to the inboard shoulder main groove 4. The inboard central land portion 9 is separated into a plurality of inboard central blocks 9A by a plurality of the second central sipes 11. The second central sipes 11 may increase ground contact pressure to be acted on the inboard central land portion 9.

Preferably, the second central sipes 11 are inclined in the same direction with respect to the axial direction of the tire as the first central sipes 10. Preferably, the second central sipes 11 are inclined at an angle θ2 equal to or less than 40 degrees with respect to the axial direction of the tire at the junctions to the central main groove 5. When the angle θ2 is more than 40 degrees, rigidity of each junction, i.e., rigidity of each third acute angled portion 23 formed between a second central sipe 11 and the central main groove 5 may locally decrease, and thus wear resistance may be deteriorated.

Preferably, each third acute angled portion 23 is also provided with a chamfered portion 21 same as the first acute angled portions 20. Furthermore, each fourth acute angled portion 24 which is a portion formed between a second central sipe 11 and the inboard shoulder main groove 4 is also formed as a chamfered portion 21. These chamfered portion 21 prevent local decrease of rigidity in the third and fourth acute angled portions 23 and 24 to further improve wear resistance.

The second central sipes 11, in this embodiment, do not include any portion extending in parallel with the axial direction of the tire. Thus, the second central sipes 11 can close itself at cornering that large lateral force acts on the inboard central land portion 9. Accordingly, circumferentially adjacent inboard central blocks 9A support each other to enhance lateral rigidity of the tread portion 2 when cornering, and thus wear resistance of the tire can further be improved by reducing deformation of the inboard central land portion 9 during cornering.

Preferably, an extension line of the groove centerline of each first central sipe 10 and an extension line of the groove centerline of each second central sipe 11 intersect to have an intersection P within the central main groove 5. That is, the first central sipes 10 are preferably continuous to the second central sipes 11 smoothly through the central main groove 5. Since these first central sipes 10 and second central sipes 11 are inclined in the same direction, they have less overlapping portion when the respective sipes are projected onto the tire equatorial plane. Thus, sufficient rigidity of the outboard central land portion 8 and the inboard central land portion 9 can be maintained without having a portion where rigidity decreases locally.

Preferably, the first central sipes 10 may be formed as an arc shape convex to one direction with respect to the circumferential direction of the tire, and the second central sipes 11 may be formed as an arc shape convex to the other direction with respect to the circumferential direction of the tire. The pneumatic tire 1 provided with such first central sipes 10 and second central sipes 11 would exert its performance regardless of the rotational direction of the tire. Furthermore, since the first central sipes 10 as well as the second central sipes 11 extend in a manner that includes no corner portions, there is less possibility that uneven wear around the sipes occurs. Note that the first central sipes 10 and the second central sipes 11 may be formed as a straight shape or a curve (e.g., an S-shape and the like) without having an acute angled corner.

In this embodiment, the outboard central land portion 8 is provided with at least one third central sipe 12 between adjacent first central sipes 10 and 10 wherein at least one end of the third central sipe terminates within the outboard central land portion 8. Preferably, the third central sipe 12 has a width of less than 2 mm and a cross section same as the first central sipes 10 and the second central sipes 11, for example.

Preferably, the third central sipe 12 has an axial length L1 equal to or more than 50% the axial width W8 of the outboard central land portion 8. More preferably, the axial length L1 of the third central sipe 12 is in a range of from 60% to 75% the axial width W8 of the outboard central land portion 8. The third central sipe 12 may optimize rigidity of the outboard central land portion 8 so that the wear of the outboard central land portion 8 becomes uniform in the circumferential direction of the tire.

The third central sipe 12, for example, inclines in the same direction as the first central sipes 10. Preferably, the third central sipe 12 has an angle $\theta 3$ of equal to or less than 40 degrees with respect to the axial direction of the tire at a junction to the central main groove 5. When the angle $\theta 3$ is more than 40 degrees, rigidity of the above junction, i.e., rigidity of a fifth acute angled portion 25 formed between the third central sipe 12 and the central main groove 5 may locally decrease, and thus wear resistance of the tire may be deteriorated.

In this embodiment, the fifth acute angled portion 25 is also provided with a chamfered portion 21 same as the first acute angled portions 20. Furthermore, a sixth acute angled portion 26 formed between the third central sipe 12 and the outboard shoulder main groove 3 is also provided with a chamfered portion 21. These chamfered portions 21 may improve the respective rigidity of the fifth and sixth acute angled portions 25 and 26, and prevent uneven wear.

Preferably, the number N2 of the second central sipes 11 provided on the inboard central land portion 9 may be set smaller than a total number N1 of the first central sipes 10 and the third central sipe 12 provided on the outboard central land portion 8. More preferably, the number N2 of the second central sipes 11 is in a range of from 40% to 70% the total number N1 of the first central sipes 10 and the third central sipe 12. Thus, even when the tire is mounted on a vehicle with negative camber, the inboard central land portion 9 may exhibit an excellent wear resistance for long life.

Preferably, the angle $\theta 2$ of the second central sipes 11 is greater than the angles $\theta 1$ and $\theta 3$ of the first central sipes 10 and the third central sipe 12, respectively. Preferably, the angle $\theta 2$ is in a range of from 30 to 40 degrees, for example. Preferably, the angles $\theta 1$ and $\theta 3$ are in a range of from 20 to 30 degrees, for example. The second central sipes 11 may optimize rigidity of the inboard central land portion 9 that includes less sipes.

The at least one third central sipe 12, for example, includes an outer third central sipe 12o in communication with the outboard shoulder main groove 3 and an inner third central sipe 12i in communication with the central main groove 5. The outer third central sipe 12o and the inner third central sipe 12i are preferably arranged alternately in the circumferential direction of the tire. This configuration may further optimize rigidity of the outboard central land portion 8.

As illustrated in FIG. 1, the land portions in accordance with the present embodiment further include an outboard shoulder land portion 6 disposed between the outboard shoulder main groove 3 and the outboard tread edge To, and an inboard shoulder land portion 7 disposed between the inboard shoulder main groove 4 and the inboard tread edge Ti.

Preferably, the outboard shoulder land portion 6 is provided with a plurality of outboard shoulder lug grooves 15 having a width equal to or more than 2 mm and a plurality of outboard shoulder sipes 16 having a width of less than 2 mm. Preferably, the outboard shoulder lug grooves 15 and the outboard shoulder sipes 16 are arranged alternately in the circumferential direction of the tire.

The outboard shoulder lug grooves 15 extend from axially inner ends which are not in communication with the outboard shoulder main groove 3 to axially outer ends located beyond the outboard tread edge To. Preferably, the outboard shoulder lug grooves 15 have a width W6 in a range of from 35% to 50% the width W3 of the central main groove 5. When the width W6 of the outboard shoulder lug grooves 15 is less than 35% the width W3 of the central main groove 5, drainage performance on wet surfaces may be deteriorated. When the width W6 of the outboard shoulder lug grooves 15 is more than 50% the width W3 of the central main groove 5, wear resistance of the tire may be deteriorated due reduced rigidity of the outboard shoulder land portion 6.

The axially inner ends of outboard shoulder lug grooves 15 terminate within the outboard shoulder land portion 6. This configuration may reduce tire traveling noise by separating the outboard shoulder lug grooves 15 from the outboard shoulder main groove 3.

Furthermore, since the outboard shoulder land portion 6 is configured as a circumferentially and continuously extending rib, the rigidity of the outboard shoulder land portion 6, which is subject to large lateral force during cornering, can be improved.

Figure 6:
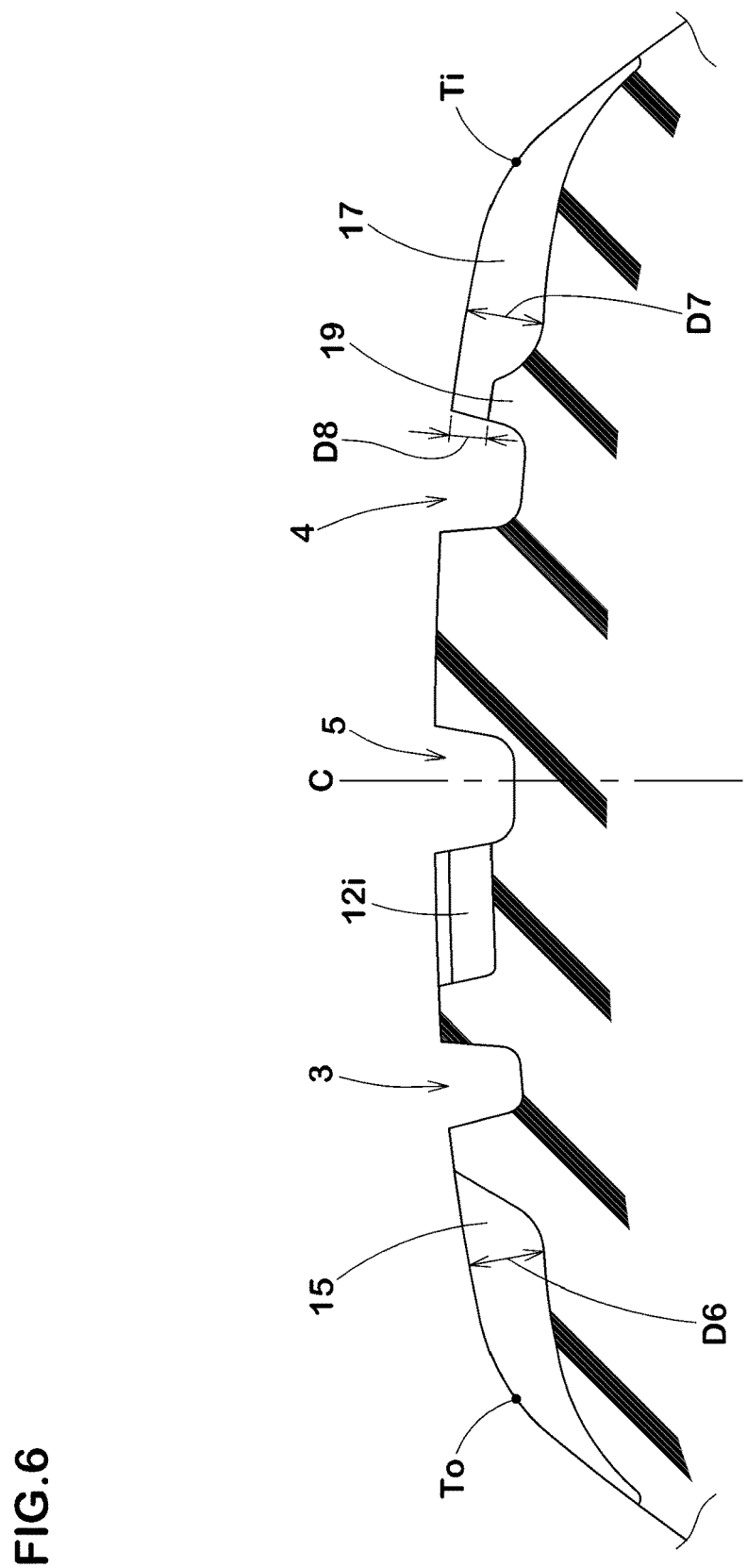
FIG. 6 is a cross-sectional view taken along a line B-B of FIG. 1.

FIG. 6 illustrates a cross-sectional view of the tread portion 2 taken along a line B-B of FIG. 1. As illustrated in FIG. 6, a depth D6 of the outboard shoulder lug grooves 15 is preferably in a range of not more than 100% of the depth D1 (illustrated in FIG. 2) of the outboard shoulder main groove 3 in order to improve drainage performance on wet surfaces.

As illustrated in FIG. 1, the outboard shoulder sipes 16 extend axially outwardly from the outboard shoulder main groove 3 and terminate within the outboard shoulder land portion 6 without reaching the outboard tread edge To.

Preferably, the outboard shoulder sipes 16 have cross sections same as the first central sipes 10, for example. Preferably, the outboard shoulder sipes 16 have an axial length L2 in a range of from 40% to 70% an axial width W9 of the outboard shoulder land portion 6 to optimize rigidity of the outboard shoulder land portion 6.

The outboard shoulder land portion 6 includes a seventh acute angled portion 27 formed between each outboard shoulder sipe 16 and the outboard shoulder main groove 3. The respective seventh acute angled portion 27 is also provided with a chamfered portion 21 same as that of the first acute angled portion 20. The chamfered portion 21 may prevent local decrease of rigidity in the seventh acute angled portion 27 to further improve wear resistance.

Preferably, the outboard shoulder sipes 16 are continuous to the first central sipes 10 smoothly through the outboard shoulder main groove 3. Thus, the outboard shoulder sipes 16 are not overlapped with the first central sipes 10 in the axial direction of the tire, and sufficient rigidity of the outboard shoulder land portion 6 and the outboard central land portion 8 can be maintained without having a portion where rigidity decreases locally.

Preferably, the inboard shoulder land portion 7 is provided with a plurality of inboard shoulder lug grooves 17 having a width equal to or more than 2 mm, and a plurality of inboard shoulder sipes 18 having a width of less than 2 mm. Preferably, the inboard shoulder lug grooves 17 and inboard shoulder sipes 18 are arranged alternately in the circumferential direction of the tire.

Preferably, the inboard shoulder lug grooves 17 extends axially outwardly from the inboard shoulder main groove 4 beyond the inboard tread edge Ti. A width W7 of the inboard shoulder lug grooves 17 is preferably in a range of from 35% to 50% the width W3 of the central main groove 5. When the width W7 of the inboard shoulder lug grooves 17 is less than 35% the width W3 of the central main groove 5, drainage performance may be deteriorated. When the width W7 of the inboard shoulder lug grooves 17 is more than 50% the width W3 of the central main groove 5, wear resistance may be deteriorated. Furthermore, since the inboard shoulder lug grooves 17 are in communication with the inboard shoulder main groove 4, the drainage performance improves.

As illustrated in FIG. 6, the inboard shoulder lug grooves 17 preferably have a maximum depth D7 in a range of not more than 100% of the depth D2 of the inboard shoulder main groove 4 as illustrated in FIG. 2. At least one inboard shoulder lug groove 17 has a tie-bar 19 that raises the bottom. Preferably, the tie-bar 19 has a depth D8 in a range of from 50% to 60% of the maximum depth D7 of the inboard shoulder lug grooves 17. The inboard shoulder lug grooves 17 with the tie-bar 19 may increase rigidity in an axially inner portion of the inboard shoulder land portion 7 to further improve wear resistance.

As illustrated in FIG. 1, the inboard shoulder land portion 7 includes an eighth acute angled portion 28 formed between each inboard shoulder lug groove 17 and the inboard shoulder main groove 4. In this embodiment, the eighth acute angled portion 28 is also provided with a chamfered portion 21 same as that of the first acute angled portion 20. The chamfered portion 21 may prevent local decrease of rigidity in the eighth acute angled portion 28 to further improve wear resistance.

Preferably, the inboard shoulder sipes 18 extend axially outwardly from the inboard shoulder main groove 4 beyond the inboard tread edge Ti. Preferably, the inboard shoulder sipes 18 have cross sections same as that of the first central sipes 10.

Preferably, the inboard shoulder sipes 18 have an axial length L3 in a range of not less than 130% of an axial width W10 of the inboard shoulder land portion 7 in order to optimize rigidity in the inboard shoulder land portion 7.

The inboard shoulder land portion 7 also includes a ninth acute angled portion 29 formed between each inboard shoulder sipe 18 and the inboard shoulder main groove 4. In this embodiment, the ninth acute angled portion 29 is also provided with a chamfered portion 21 same as that of the first acute angled portion 20. The chamfered portion 21 may prevent local decrease of rigidity in the ninth acute angled portion 29 to further improve wear resistance.

Preferably, the inboard shoulder sipes 18 are continuous to the second central sipes 11 smoothly through the inboard shoulder main groove 4. Thus, the inboard shoulder sipes 18 are not overlapped with the second central sipes 11 in the axial direction of the tire, and sufficient rigidity of the inboard shoulder land portion 7 and the inboard central land portion 9 can be maintained without having a portion where rigidity decreases locally.

While the particularly preferable embodiments in accordance with the present invention have been described in detail, the present invention is not limited to the illustrated embodiments, but can be modified and carried out in various aspects.

EXAMPLE

Pneumatic tires 175/65R14 having a basic tread pattern illustrated in FIG. 1 were manufactured based on the detail shown in Table 1 by hand cut, and then drainage performance, wear resistance and noise performance of each tire was tested. The test method are as follows.

Drainage Performance Test:

Each test tire mounted on a rim 14×5J was set on a drum tester with a certain thickness water film and then straight hydroplaning performance was evaluated. The test results are indicated using an index based on Ref. 1 being 100. The larger the value, the better the performance is.

Wear Resistance Test:

Wear energy of the tread portion of each test tire was measured using a wear energy measurement device. The test results are evaluated using the respective reciprocals of wear energy and indicated using an index based on Ref. 1 being 100. The larger the value, the better the performance is.

Noise Performance Test:

Each test tire was installed to a passenger car, and then the test car was running on an road noise measuring road (rough-surfaced asphalt road) at a speed of 60 km/h, noise sound was measured in the inside of the car. The measuring position was near the driver's ear on the window side of the car. Measured was the sound pressure level dB(A) for overall frequency range. The results are evaluated using the respective reciprocals of the values and indicated by an index based on Ref. 1 being 100, wherein the larger the value, the better the noise performance is.

The results are shown in Table 1.

TABLE 1

|  | Ref. 1 | Ref. 2 | Ex. 1 | Ex. 2 | Ex. 3 | Ex. 4 |
|---|---|---|---|---|---|---|
| Lug groove on central land portions | Presence | Absence | Absence | Absence | Absence | Absence |
| Ratio W11/W8 (%) | 100 | 98 | 102 | 102 | 102 | 102 |
| Sipe maximum angle (deg.) | 45 | 36 | 36 | 45 | 36 | 36 |
| Chamfered portion on acute angled portions | Absence | Presence | Presence | Presence | Absence | Presence |
| Tie-bar on inboard shoulder lug groove | Absence | Presence | Presence | Presence | Presence | Absence |
| Drainage performance (index) | 100 | 110 | 120 | 120 | 120 | 120 |
| Wear resistance (index) | 100 | 120 | 140 | 130 | 130 | 130 |
| Noise performance (index) | 100 | 110 | 110 | 110 | 110 | 110 |

As apparent from Table 1, it was confirmed that the example tires had improved drainage performance as well as wear resistance while maintaining noise performance.

What is claimed is:

1. A pneumatic tire comprising:
   a tread portion provided with a plurality of circumferentially and continuously extending main grooves to form a plurality of land portions, the tread portion comprising a designated installing direction to a vehicle to have an outboard tread edge and an inboard tread edge;
   the main grooves comprising an outboard shoulder main groove disposed on the side of the outboard tread edge, an inboard shoulder main groove disposed on the side of the inboard tread edge and a central main groove disposed between the outboard shoulder main groove and the inboard shoulder main groove;
   the land portions comprising an outboard central land portion between the outboard shoulder main groove and the central main groove, and an inboard central land portion between the inboard shoulder main groove and the central main groove;
   the outboard central land portion being provided with a plurality of first central sipes having a width of less than 2 mm and third central sipes each having a width of less than 2 mm and at least one end terminating within the outboard central land portion, the outboard central land portion being not provided with any grooves having a width equal to or more than 2 mm;
   the inboard central land portion being provided with a plurality of second central sipes having a width of less than 2 mm, the inboard central land portion being not provided with any grooves having a width equal to or more than 2 mm;
   the first central sipes extending from the central main groove to the outboard shoulder main groove;
   the second central sipes extending from the central main groove to the inboard shoulder main groove;
   the inboard central land portion having an axial width greater than an axial width of the outboard central land portion; and
   the third central sipes comprising outer third central sipes in communication with the outboard shoulder main groove and inner third central sipes in communication with the central main groove, the outer third central sipes and the inner third central sipes being arranged alternately in a tire circumferential direction, wherein only either one of the outer third central sipes and the inner third central sipes is arranged between first central sipes which are adjacent to each other in the tire circumferential direction.

2. The pneumatic tire according to claim 1, wherein the first central sipes, the second central sipes and the third central sipes are inclined at an angle equal to or less than 40 degrees with respect to an axial direction of the tire.

3. The pneumatic tire according to claim 1, wherein the number of the second central sipes provided on the inboard central land portion is in a range of from 40% to 70% of a total number of the first central sipes and the third central sipes provided on the outboard central land portion.

4. The pneumatic tire according to claim 1, wherein the third central sipes have axial lengths in a range of from 60% to 75% of the axial width of the outboard central land portion.

5. The pneumatic tire according to claim 1, wherein the axial width of the inboard central land portion is in a range of from 101% to 105% of an axial width of the outboard central land portion.

6. The pneumatic tire according to claim 1, wherein a width of the outboard shoulder main groove is in a range of from 60% to 80% of a width of the inboard shoulder main groove.

7. The pneumatic tire according to claim 1, wherein
   the land portions further comprise an outboard shoulder land portion between the outboard shoulder main groove and the outboard tread edge and an inboard shoulder land portion between the inboard shoulder main groove and the inboard tread edge,
   the outboard shoulder land portion is provided with outboard shoulder lug grooves having a width equal to or more than 2 mm,
   the inboard shoulder land portion is provided with inboard shoulder lug grooves having a width equal to or more than 2 mm,
   the outboard shoulder lug grooves extend from axially inner ends being not in communication with the outboard shoulder main groove to an axially outer ends located beyond the outboard tread edge, and
   the inboard shoulder lug grooves extend axially outwardly from the inboard shoulder main groove beyond the inboard tread edge.

8. The pneumatic tire according to claim 1,
   wherein a width W1 of the outboard shoulder main groove is smaller than a width W2 of the inboard shoulder main groove, and the width W2 of the inboard shoulder main groove is smaller than a width W3 of the central main groove, and
   wherein the width W1 of the outboard shoulder main groove is in a range of from 60% to 80% the width W2 of the inboard shoulder main groove.

9. The pneumatic tire according to claim 1, wherein sipe depths D4 of the first central sipes and the second central sipes are in a range of from 50% to 90% of a depth D3 of the central main groove.

10. The pneumatic tire according to claim 1, wherein each of the first central sipes is continuous to each of the second central sipes smoothly through the central main groove such that an extension line of the groove centerline of each first central sipe and an extension line of the groove centerline of each second central sipe intersect to have an intersection P within the central main groove.

11. The pneumatic tire according to claim 1, wherein
each of the first central sipes and the second central sipes comprises a sipe main body and a top opening,
the sipe main body has a width of less than 1 mm,
the top opening is located radially outward of the sipe main body, and
the top opening is widened in both sides of the sipe main body in a width direction of the sipe main body,
wherein a width W5 of the top opening is equal to or more than 1 mm, but less than 2 mm and a depth D5 of the top opening is in a range of from 0.5 to 2.0 mm.

12. The pneumatic tire according to claim 11, wherein the top opening is provided over the entire length of the first central sipes and the second central sipes.

13. A pneumatic tire comprising:
a tread portion provided with a plurality of circumferentially and continuously extending main grooves to form a plurality of land portions, the tread portion comprising a designated installing direction to a vehicle to have an outboard tread edge and an inboard tread edge;
the main grooves comprising an outboard shoulder main groove disposed on the side of the outboard tread edge, an inboard shoulder main groove disposed on the side of the inboard tread edge and a central main groove disposed between the outboard shoulder main groove and the inboard shoulder main groove;
the land portions comprising an outboard central land portion between the outboard shoulder main groove and the central main groove, an inboard central land portion between the inboard shoulder main groove and the central main groove, and an inboard shoulder land portion between the inboard shoulder main groove and the inboard tread edge;
the outboard central land portion being provided with a plurality of first central sipes having a width of less than 2 mm, the outboard central land portion being not provided with any grooves having a width equal to or more than 2 mm;
the inboard central land portion being provided with a plurality of second central sipes having a width of less than 2 mm, the inboard central land portion being not provided with any grooves having a width equal to or more than 2 mm, wherein the inboard central land portion has an axial width greater than an axial width of the outboard central land portion;
the first central sipes extending from the central main groove to the outboard shoulder main groove;
the second central sipes extending from the central main groove to the inboard shoulder main groove;
the inboard shoulder land portion being provided with inboard shoulder sipes each having a width of less than 2 mm,
wherein
the inboard shoulder sipes are inclined in a same direction as the second central sipes with respect to a tire axial direction,
the inboard shoulder sipes extend axially outwardly from the inboard shoulder main groove beyond the inboard tread edge, and
the inboard shoulder sipes are smoothly continuous with respect to the respective second central sipes through the inboard shoulder main groove such that extension lines of the groove centerlines of the inboard shoulder sipes and extension lines of the groove centerlines of the second central sipes intersect with one another at intersections within the inboard shoulder main groove; and
the inboard shoulder land portion being further provided with inboard shoulder lug grooves each having a width equal to or more than 2 mm, wherein the inboard shoulder lug grooves extend axially outwardly from the inboard shoulder main groove beyond the inboard tread edge.

14. The pneumatic tire according to claim 13, wherein the inboard shoulder lug grooves and inboard shoulder sipes are arranged alternately in a circumferential direction of the tire.

15. The pneumatic tire according to claim 14, wherein
the land portions further comprise an outboard shoulder land portion between the outboard shoulder main groove and the outboard tread edge,
the outboard shoulder land portion is provided with outboard shoulder sipes each having a width of less than 2 mm, and
the outboard shoulder sipes extend axially outwardly from the outboard shoulder main groove and terminate within the outboard shoulder land portion without reaching the outboard tread edge.

16. The pneumatic tire according to claim 15, wherein the outboard shoulder sipes each have an axial length in a range of from 40% to 70% of an axial width of the outboard shoulder land portion.

17. The pneumatic tire according to claim 15, wherein the outboard shoulder sipes are continuous to the first central sipes smoothly through the outboard shoulder main groove such that extensions of groove centerlines of the outboard shoulder sipes are continuous to extensions of groove centerlines of the first central sipes.

* * * * *